Patented Nov. 26, 1929

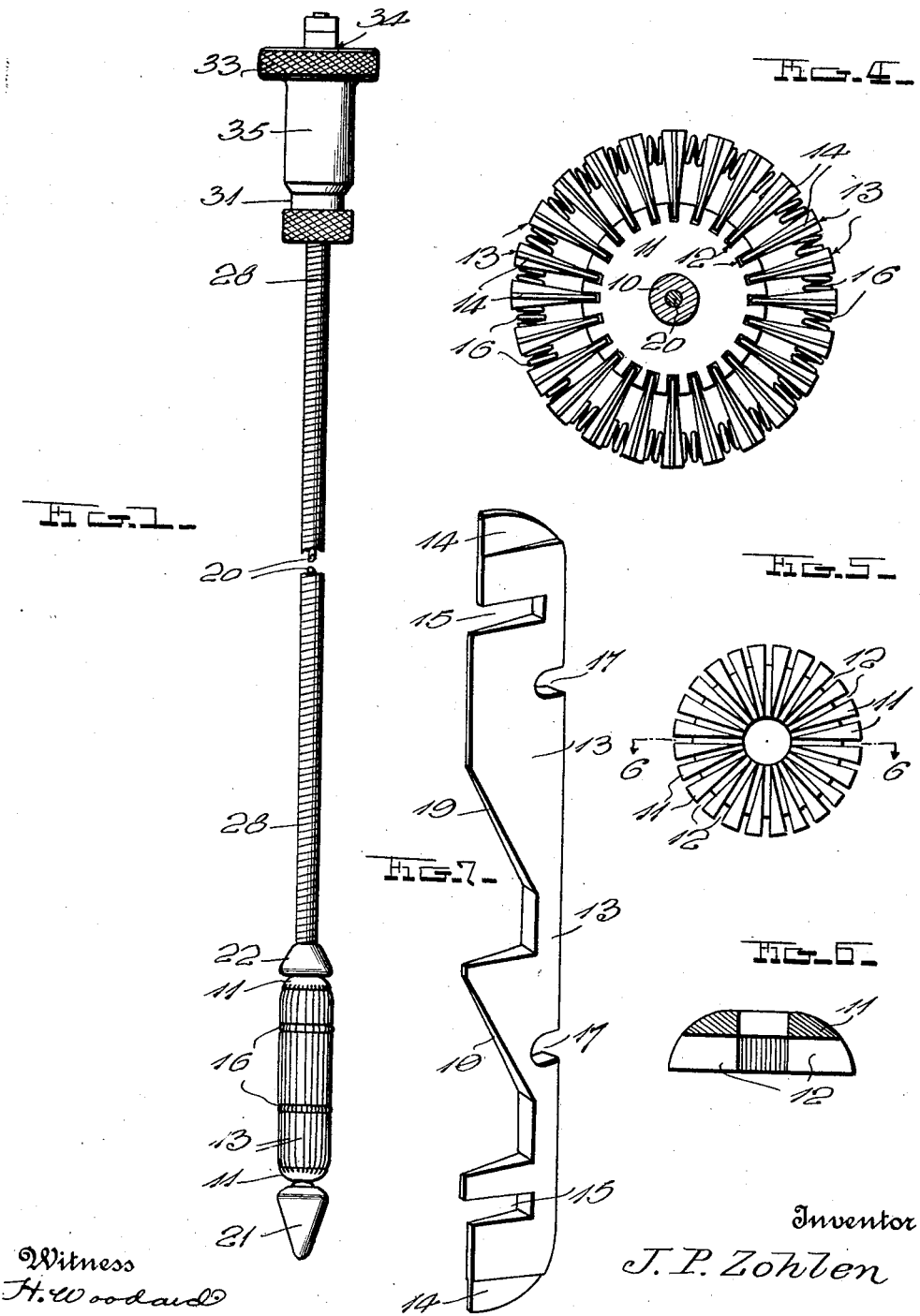

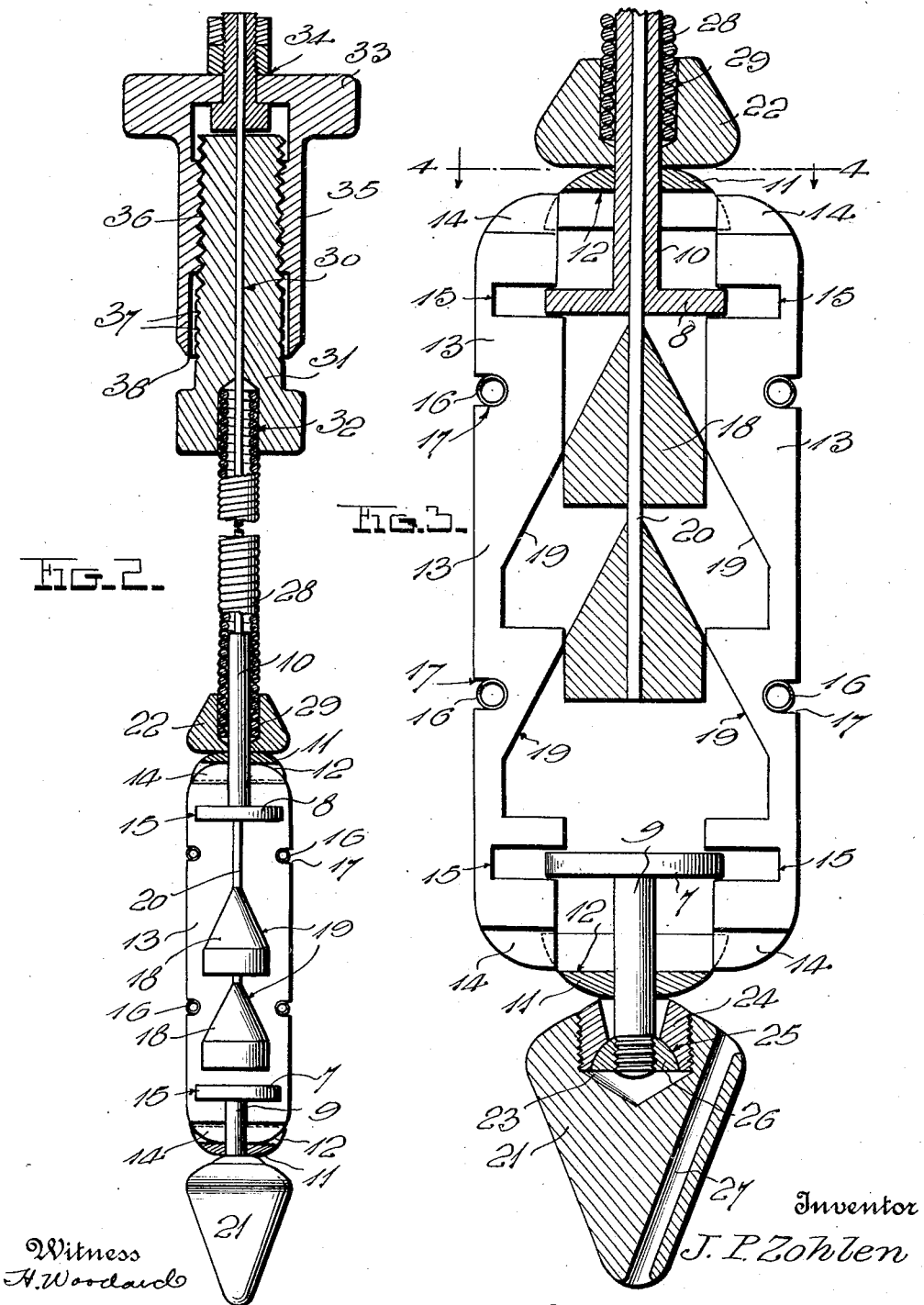

1,737,488

UNITED STATES PATENT OFFICE

JOHN P. ZOHLEN, OF SHEBOYGAN, WISCONSIN

DILATOR

Application filed December 6, 1928. Serial No. 324,235.

The invention relates to improvements in dilators for various passages in the bodies of human beings or other animals and the construction of the device is such that with variances in size only, the device may be used for dilating the esophagus, uterus, rectum, etc.

The dilator is of the general type in which an expansible body is provided, and means are employed for expanding said body after insertion, and one object of the invention is to provide new and improved means for inserting and withdrawing the body and for expanding and contracting it.

A further aim is to make unique provision whereby the extent to which the body has been expanded, may be determined by means of indicating means adjacent an operating knob or the like remote from said body.

Still further objects are to provide a unique and advantageous construction for the expansible body, to provide this body with inexpansible front and rear pilots which readily guide it during insertion and removal, and to mount the front pilot in such manner that it is free to swing laterally in any direction, according to curvatures of the passage into which the dilator is being inserted.

With the foregoing in view, the invention resides in the novel subject matter hereinafter described and claimed, description being accomplished by reference to the accompanying drawings.

Fig. 1 is a side elevation.

Fig. 2 is a central longitudinal section showing the body contracted.

Fig. 3 is an enlarged sectional view similar to a portion of Fig. 2 showing the body expanded.

Fig. 4 is a transverse sectional view on line 4—4 of Fig. 3.

Fig. 5 is an inner side elevation of one of the end caps of the body.

Fig. 6 is a sectional view on line 6—6 of Fig. 5.

Fig. 7 is a view of one of the segmental body sections.

The construction shown by the drawings will be herein specifically explained with the understanding that within the scope of the invention as claimed, variations may be made. Moreover, it is to be understood that while I will hereinafter make use of such terms as "front" and "rear", these terms are used for convenience of description only and hence are relative rather than limiting.

The device embodies front and rear disks 7—8 respectively, the former being provided with a central forwarding projecting stem 9 while the disk 8 is provided with a rearwardly projecting tubular stem 10, both disks and their stems being in axial alinement. Mounted upon the stem 9 in forwardly spaced relation with the disk 7 and upon the stem 10 in rearwardly spaced relation with the disk 8, are two end caps 11, the inner sides of these caps being provided with a plurality of radial guide grooves 12. A plurality of preferably segmental body sections 13 extend between the two caps 11, are disposed about the axes of these caps, and are provided with thinned ends 14 slidably received in the grooves 12. The inner edges of these body sections 13 are formed with transverse slots or notches 15 which receive the disks 7—8. Said slots or notches 15 and said disks 7—8 form additional guiding means for the radial movements of the body sections 13 and also hold the stems 9—10 against outward movement with respect to the body formed by said sections. For normally contracting this body by inwardly sliding the various sections 13, self-contracting rings 16 have been shown around said body and received in notches 17 in the outer edges of the body sections, each ring 16 being preferably in the form of a coiled spring. For expanding the body by outwardly sliding the sections 13, front and rear cones 18 are provided, said cones being cooperable with cams 19 at the inner edges of said body sections. An operating element 20 is provided for the cones 18, said element being in the form of a resilient wire upon which both cones are secured. This wire passes slidably through the tubular stem 10 and extends rearwardly therefrom and is operated by means hereinafter described.

A front pilot or "olive point" 21 is mounted on the stem 9 immediately in front of the front cap 11, and a rear pilot or "olive end"

22 is secured around the stem 10 at the rear side of the rear cap 11. These pilots assist materially in opening up the passage into which the dilator is being forced or from which it is being removed, and guiding the body in such manner as to inflict no pain upon the patient. The front pilot 21 is preferably mounted in such manner that it may laterally swing in any direction, assisting in guiding the entire dilator around curves in the passage within which it is used. In the present showing, the rear end of this pilot is provided with a cylindrical recess 23 receiving an annular plug 24 which loosely surrounds the front end of the stem 9. This plug is formed with a hemispherical socket 25 in its front end, and a similarly shaped nut 26 is threaded on the stem 9, being received in the socket. While this construction effectively holds the parts assembled and permits removal of one pilot and substitution of one of different size, it also permits free lateral tilting of the pilot in any direction.

In addition to possessing the characteristics already described, the pilot 21 is preferably formed with a longitudinal opening 27 to receive a leader thread whenever advisable.

Secured around and projecting rearwardly from the stem 10, is a resilient tube 28 preferably formed of a spring wire coil. In the present showing, the front end of this tube is received in a recess 29 in the rear end of the pilot 22. The wire 20 passes rearwardly through and beyond the tube 28, the rear end of said wire being passed through a central bore 30 in a cylindrical body 31 to which the rear end of said tube 28 is secured, the front end of said body 31 being preferably formed with a recess 32 in which said tube end is anchored. An operating knob 33 is swiveled at 34 upon the rear extremity of the wire 20 and said knob is provided with a sleeve 35 having a threaded engagement 36 with the body 31, a left-hand thread being preferably employed. Turning of the knob 33 in one direction, causes it to pull rearwardly upon the wire 20 while reacting upon the body 31 and the tube 28, with the result that the cones 18 are pulled rearwardly, causing co-operation of these cones with the cams 19 to outwardly force the body sections 13, thereby expanding the dilator body. Preferably, the exterior of the body 31 is provided with a plurality of longitudinally spaced indicating grooves 37 and the front end of the sleeve 35 is beveled to provide an indicator 38 co-operable with said grooves in showing, by the relative position of sleeve 35 and grooves 37, the extent to which the dilator body has been expanded at various adjustments of the knob 33. Hence, there is no danger of the physician or other person using the device, expanding the dilator body after insertion, to a greater extent than is desired.

Upon rotation of the knob 33, in the opposite direction from that above mentioned, the cones 18 are forwardly moved permitting the springs 16 to contract the dilator body. By preference, this entire body is provided with an elastic covering (not shown) which prevents the entrance of any tissue between the body sections 13.

It will be seen from the foregoing that a rather simple and inexpensive, yet an efficient and desirable device has been provided, and while the details disclosed are preferable, attention is again invited to the fact that variations may be made within the scope of the invention as claimed. Moreover, it is to be understood that any desired material or materials may be used in constructing the device and that it may be formed of any size suitable to the purpose for which it is to be used.

I claim:—

1. A dilator comprising an expansible and contractible body, a resilient tube having one of its ends connected with one end of said body, means within said body for expanding it, a resilient wire extending longitudinally through said tube and connected with said expanding means for operating the latter upon longitudinal movement of said wire, and manually actuated means connected with the outer end of said wire and reacting against the outer end of said tube for moving said wire longitudinally to vary the diameter of said expansible body.

2. A dilator comprising an expansible and contractible body, a resilient tube having one of its ends connected with one end of said body, means within said body for expanding it, a resilient wire extending longitudinally through said tube and connected with said expanding means for operating the latter upon longitudinal movement of said wire, a cylindrical body secured to the outer end of said tube, and a manually rotatable knob swiveled on the outer end of said wire, said knob having a threaded engagement with said cylindrical body, whereby rotation of said knob will longitudinally move said wire to vary the diameter of said expansible body.

3. A structure as specified in claim 1; together with co-operable wire-and-tube-carried indicating means for showing the extent of expansion of said body at various positions of said wire.

4. A structure as specified in claim 2; together with co-operable indicating means on said knob and said cylindrical body for showing the extent of expansion of said expansible body at various adjustments of said knob.

5. A dilator comprising an expansible and contractible body, a resilient tube having one of its ends connected with one end of said body, means within said body for expanding it, a resilient wire extending longitudinally through said tube and connected with said expanding means for operating the latter upon longitudinal movement of said wire, a cylindrical body secured to the outer end of said tube, and a manually rotatable knob having a sleeve threaded upon said cylindrical body, said knob being swiveled upon the outer end of said wire, whereby rotation of the knob and sleeve will longitudinally move said wire to vary the diameter of said expansible body, said cylindrical body being provided with indicators co-operable with said sleeve in showing the extent of expansion of said expansible body at various adjustments of said knob.

6. A dilator comprising an expansible body, an inexpansible pilot member in advance of said body, connecting means between said body and said pilot member mounting the latter for free lateral swinging, and means independent of said pilot member for expanding said body.

7. A dilator comprising an expansible body of fixed length, an inexpansible pilot in advance of said body, connecting means between said body and said pilot, a second inexpansible pilot and means mounting it at the rear end of said body, said connecting means, mounting means and body holding said pilots against relative longitudinal movement, and means for expanding said body without otherwise varying its relation with said pilots.

8. A dilator comprising two spaced axially alined disks each having a central outwardly projecting stem, the rearmost of which is tubular, two end caps mounted on said stems respectively in outwardly spaced relation with said disks, said caps having radial guideways at their inner sides, a plurality of body sections whose ends are slidably received in said guideways, the inner edges of said body sections having slots slidably receiving said disks, expanding means for said body sections, and an operating element for said expanding means passing through said tubular stem and extending rearwardly therefrom.

9. A structure as specified in claim 8, together with front and rear pilots mounted on said stems at the outer sides of said caps.

10. A structure as specified in claim 8, together with a resilient tube secured to the tubular stem and extending rearwardly around said operating element, and means at the rear end of said tube for operating said element.

11. A structure as specified in claim 8; together with front and rear pilots mounted on said front and rear stems, a resilient tube secured to the tubular stem and extending rearwardly around said operating element, and means at the rear end of said tube for operating said element.

12. A structure as specified in claim 8; said expanding means comprising front and rear cones, and co-acting cams on said body sections; and self-contracting rings around the body formed by said sections for normally contracting said body.

In testimony whereof I have hereunto affixed my signature.

JOHN P. ZOHLEN.